(12) United States Patent
Sai et al.

(10) Patent No.: US 6,822,661 B2
(45) Date of Patent: Nov. 23, 2004

(54) INFORMATION-DISPLAY CONTROL APPARATUS AND METHOD

(75) Inventors: Kairi Sai, Tokyo (JP); Hidetoshi Ichioka, Tokyo (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 09/915,847

(22) Filed: Jul. 26, 2001

(65) Prior Publication Data

US 2002/0011988 A1 Jan. 31, 2002

(30) Foreign Application Priority Data

Jul. 28, 2000 (JP) ..................................... P2000-229220

(51) Int. Cl.⁷ .............................. G09G 5/00; G06F 3/00
(52) U.S. Cl. ........................................ 345/716; 725/39
(58) Field of Search ......................... 725/37, 39, 40–45, 725/46, 55, 88, 104, 47; 386/46, 83, 52, 55, 1; 345/716, 719

(56) References Cited

U.S. PATENT DOCUMENTS

| | | | | |
|---|---|---|---|---|
| 5,479,268 A | * | 12/1995 | Young et al. ................. | 386/83 |
| 5,726,702 A | * | 3/1998 | Hamaguchi et al. .......... | 725/55 |
| 6,147,715 A | * | 11/2000 | Yuen et al. ................... | 348/565 |
| 6,154,203 A | * | 11/2000 | Yuen et al. ................... | 725/52 |
| 6,172,677 B1 | * | 1/2001 | Stautner et al. ............. | 345/716 |
| 6,236,395 B1 | * | 5/2001 | Sezan et al. ................. | 345/723 |
| 6,323,911 B1 | * | 11/2001 | Schein et al. ............... | 348/552 |
| 6,351,596 B1 | * | 2/2002 | Ostrover ....................... | 386/46 |
| 2001/0051037 A1 | * | 12/2001 | Safadi et al. ................. | 386/83 |
| 2002/0133823 A1 | * | 9/2002 | Sekimoto et al. ............. | 725/58 |

* cited by examiner

*Primary Examiner*—Alexander Eisen
(74) *Attorney, Agent, or Firm*—Frommer Lawrence & Haug LLP; William S. Frommer; Bruno Polito

(57) ABSTRACT

The video content (program A) currently reproduced is displayed in a video-display area. The complete information of the video content being selected by a selection cursor is displayed in a detailed-information area, and the icon image of the video content being selected is displayed in a selected-video-display area. The icon of the video content (program A) being reproduced is displayed with a "being-reproduced" mark. The icon of a video content (program E) which has already been viewed is displayed with an "already-viewed" mark. The icon of a video content of which medium data has been deleted is displayed light or in gray.

5 Claims, 6 Drawing Sheets

FIG. 6

| | | | | | |
|---|---|---|---|---|---|
| PROGRAM A | PROGRAM D<br>7:30 PM-9:00 PM<br>AUDIENCE RATING 20.1% | | NOT VIEWED | | PROGRAM D |
| | 2000/07/07<br>7:00PM | 8:00PM | | 9:00PM | 10:00PM |
| CHANNEL-1 | xxxx xxx | BEING REPRODUCED | PROGRAM A 120 min<br>24.5% | xxxx | xxxx xxx |
| CHANNEL-2 | xxxx xxx | PROGRAM B 50 min<br>15.4% | PROGRAM C 90 min<br>16.7% | | xxxx xxx |
| CHANNEL-3 | xxxx xxx | xxx | PROGRAM D 90 min<br>20.1% | ALREADY VIEWED | PROGRAM E 100 min<br>22.4% |
| CHANNEL-4 | xxxx xxx | xxxx | xxxx | xxx | xxxx xxx |
| CHANNEL-5 | xxxx xxx | xxxx | xxxx | xxx | xxxx xxx |
| CHANNEL-6 | xxxx PRO-GRAM F | xxxx | xxxx | xxx | xxxx xxx |

Labels: 62, 12, 63, 61, 64, 65

INFORMATION-DISPLAY CONTROL APPARATUS AND METHOD

BACKGROUND OF THE INVENTION

1. Field of the Invention

The present invention relates to information-display control apparatuses and methods, and more particularly, to an information-display control apparatus and method which allow information related to video contents to be listed and a video content being reproduced and that being selected to be displayed at respective predetermined areas.

2. Description of the Related Art

In these years, an electronic program guide (EPG) has been gradually put into practice in TV broadcasting. TV receivers and set-top boxes (STBs), such as CS tuners and CATV tuners, which support an EPG function have been widely spread. In addition, personal computers having a video function for recording programs (hereinafter called video contents) by using a web site which provides EPG data on the Internet have been commercially available.

With such EPG data, the user can directly check a program list displayed on a screen and can easily make a recording reservation or a viewing reservation of a program to be viewed, on the spot, compared with newspapers and magazines which provide TV broadcasting program guides.

Since information related to video contents, such as the video content being currently reproduced, video contents which have already been viewed, and the popularity of video contents, is not displayed in a conventional EPG screen, the user cannot easily understand the state of each video content. As a result, when the user selects a desired video content on the EPG screen, if the user forgets video contents which the user has viewed, the user may view or record again a video content which the user has already viewed.

In these days, hard-disk drives (HDDs) of audio-visual units have been made to have larger capacities and digital video recorders having a random-access storage have been commercially available. It is expected that units which can record video contents for several hundreds of hours, further, for several thousands of hours will be developed. With these units, all programs in one week at a predetermined channel may be recorded. In such a case, the EPG data needs to provide not only a future program guide but a past program guide.

It is also expected, for example, that recorded video contents are re-arranged by categories to form virtual channels.

To display past EPG data or EPG data for virtual channels, the conventional EPG screen is insufficient in terms of functions.

This is due to some reasons. First, the provided EPG data is for the present and the future. Since EPG data for video contents which have already been broadcasted is deleted in the conventional EPG screen, a past program table cannot be displayed. Secondly, when EPG data is displayed by a conventional EPG display method, if video contents are those recorded, information related to the video contents is not displayed, such as whether the medium data of the video contents have already been deleted, whether the video contents have already been viewed, and whether a video content is being reproduced, the popularity of the video contents, and in addition, when the video contents were broadcasted. Thirdly, each video content cannot be checked until the EPG screen is closed. Fourthly, all information related to each video content cannot be displayed on the EPG screen by the conventional EPG display method.

The channel is conventionally switched by the use of a channel button on a remote commander. When a program is selected on a past EPG data or on EPG data for virtual channels, the channel cannot be changed.

It is also expected that digital-versatile-disk (DVD) players which have started spreading will have a disk-changer function to manage a number of video contents.

With the progress of communication technologies, video on demand (VOD) has been becoming a reality. In video on demand, a content-list display method and an operation method which are easy and convenient are important for the user to search a huge library for a video content to be viewed.

In a conventional method for displaying a content list, however, information related to video contents is not displayed, such as whether video contents have been viewed and which the video content being reproduced is. It is difficult for the user to understand the conditions of video contents.

SUMMARY OF THE INVENTION

The present invention has been made in consideration of the above conditions. Accordingly, it is an object of the present invention to display information related to contents, and the content being reproduced and that being selected at respective predetermined areas, on a content-list screen to allow the user to easily understand the conditions of the contents in a short period.

The foregoing object is achieved in one aspect of the present invention through the provision of an information-display control apparatus including recording means for recording a plurality of contents; specifying means for specifying content information related to the plurality of contents; first display control means for controlling the display of a list of the plurality of contents according to the content information specified by the specifying means; second display control means for controlling, when a predetermined content is selected among the plurality of contents displayed in the list by the first display control means, such that the content information corresponding to the predetermined content is displayed in a first area; and third display control means for controlling, when an instruction is issued to reproduce the predetermined content among the plurality of contents displayed in the list by the first display control means, such that the predetermined content stored in the recording means is read and displayed in a second area.

The first display control means may control the display such that the plurality of contents are differentiated by their newness according to the date and time when each content is recorded.

The third display control means may control the display such that the content being reproduced is differentiated from the other contents.

The content information may include a content identification ID, a medium-data state, a viewing state, and a popularity.

The foregoing object is achieved in another aspect of the present invention through the provision of an information-display control method including a recording control step of controlling recording of a plurality of contents; a specifying step of specifying content information related to the plurality of contents; a first display control step of controlling the display of a list of the plurality of contents according to the content information specified in the specifying step; a second display control step of controlling, when a predetermined content is selected among the plurality of contents displayed in the list in the process of the first display control step, such that the content information corresponding to the predetermined content is displayed in a first area; and a third display control step of controlling, when an instruction is issued to reproduce the predetermined content among the plurality of contents displayed in the list in the process of the first display control step, such that the predetermined content for which recording is controlled in the process of the recording control step is read and displayed in a second area.

As described above, according to an information-display control apparatus and method of the present invention, when a content is selected among a plurality of contents displayed in a list, the content information corresponding to the selected content is displayed in a first area, and when an instruction is issued to reproduce the selected content, the content is displayed in a second area. Therefore, the user can easily understand the conditions of contents within a short period.

BRIEF DESCRIPTION OF THE DRAWINGS

FIG. 6 is a view showing an EPG screen.

DESCRIPTION OF THE PREFERRED EMBODIMENTS

Figure 1:
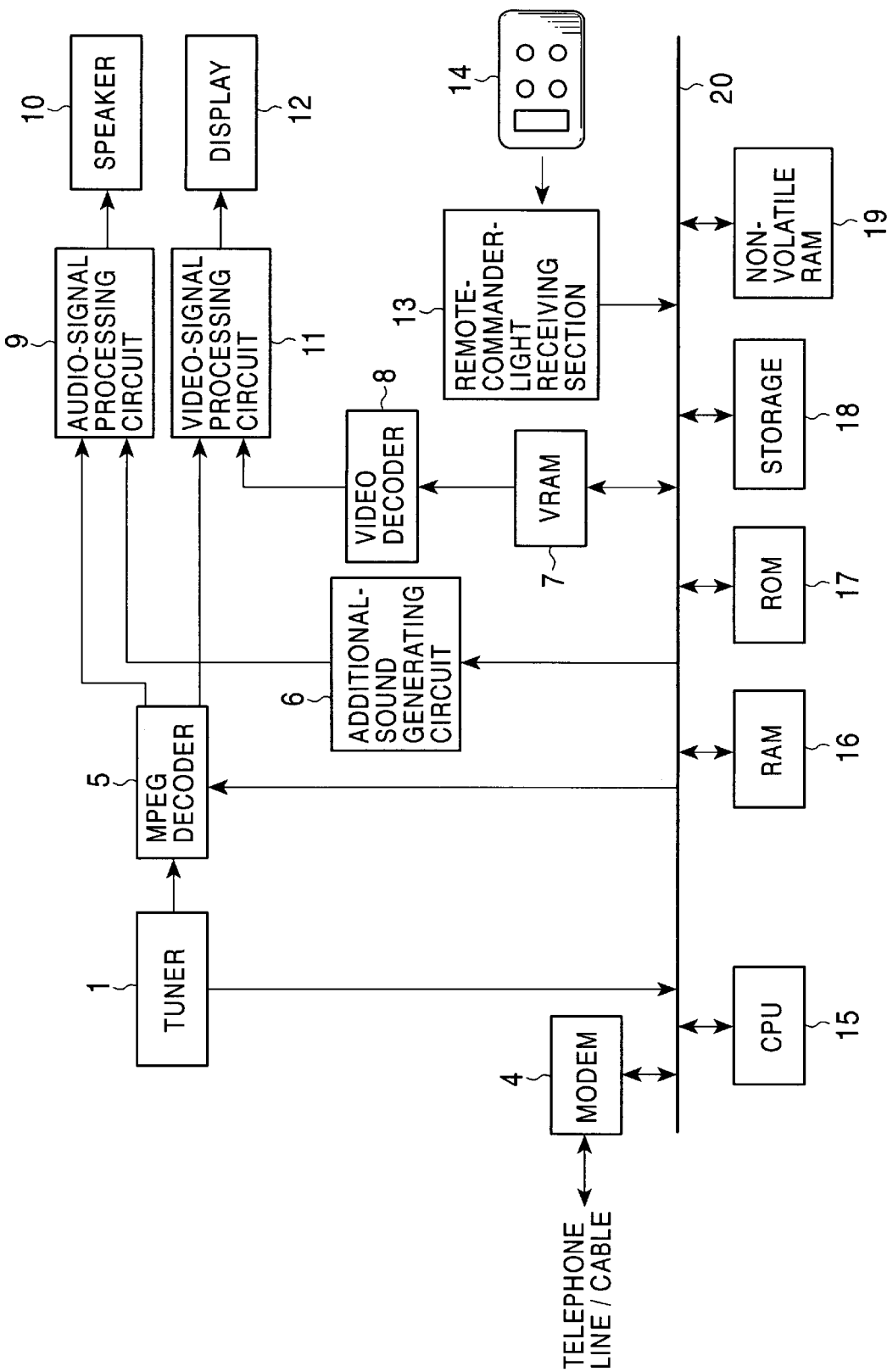
FIG. 1 is a block diagram showing an example structure of a digital video recorder according to an embodiment of the present invention.

FIG. 1 is a block diagram showing an internal example structure of a digital video recorder used for digital broadcasting according to an embodiment of the present invention.

When video to be recorded is received, a tuner 1 extracts the signal of a program which the user desires from the signals of a plurality of programs received by an antenna (not shown) to generate a Moving-Picture-Experts-Group (MPEG) data stream, and outputs it to an MPEG decoder 5. In usual receiving, the tuner 1 stores the generated MPEG data stream in a storage 18 through a bus 20. When information data related a program or electronic-program-guide (EPG) data is included in the program, the tuner 1 also extracts the data and stores it in the storage 18 or a non-volatile random-access memory (RAM) 19 through the bus 20.

A modem 4 controls communications through wires, such as telephone lines or cables. When an operating system (OS) and a control program are updated, or when data is transmitted to a broadcasting station, for example, communications with external units are performed through the modem 4 to send and receive data. The information data related to a program or the EPG data can also be obtained by communications with external units through the modem 4.

An MPEG decoder 5 decodes the data stream sent from the tuner 1. The MPEG decoder 5 also reads the data stream of a video content, stored in the storage 18 and compressed by the MPEG method, through the bus 20 and decodes the data stream. An audio signal and a video signal obtained by decoding are output to an audio-signal processing circuit 9 and to a video-signal processing circuit 11.

When the user operates a remote commander 14, an additional-sound generating section 6 generates sound for the operation and additional sound, and outputs to the sound-signal processing circuit 9.

A video decoder 8 reads image data for display, stored in a video RAM (VRAM) 7, and converts it to a video signal. The converted video signal is sent to the video-signal processing circuit 11.

The audio-signal processing circuit 9 applies digital-to-analog (D/A) conversion to the audio data sent from the MPEG decoder 5 and outputs to a speaker 10. When additional sound is sent from the additional-sound generating circuit 6, the audio-signal processing circuit 9 applies D/A conversion to the audio data sent from the MPEG decoder 5, combines the converted audio signal with the additional sound, and outputs to the speaker 10.

The video-signal processing circuit 11 applies D/A conversion to the video data sent from the MPEG decoder 5 and outputs to a display 12. When image data for display is sent from the video decoder 8, the video-signal processing circuit 11 combines the video data sent from the MPEG decoder 5 with the image data for display, applies D/A conversion, and outputs to the display 12.

The speaker 10 outputs the audio signal sent from the audio-signal processing circuit 9. The display 12 displays (reproduces) the video signal sent from the video-signal processing circuit 11.

When the user operates a remote commander 14, a remote-commander-light receiving section 13 receives the operation signal and outputs to a central processing unit (CPU) 15.

When the CPU 15 receives the operation signal (command) from the remote-commander-light receiving section 13, the CPU 15 executes various types of processing according to a program stored in a read only memory (ROM) 17 or the storage 18. When a display processing program is executed, the CPU 15 generates image data for EPG-screen display, described later, and stores it in the VRAM 7.

A RAM 16 temporarily stores an activation module, an OS, and an application program stored in the ROM 17 or the storage 18, or parameters changing as they are executed.

The ROM 17 stores a basic software module for operating the CPU 15 and the activation module. The storage 18 is formed, for example, of a magnetic hard disk or a recordable DVD disk, and stores video contents, information data related to video contents, the OS, and application programs.

The non-volatile RAM 19 is formed, for example, of a memory card or a flash memory, and stores authentication information, accounting information, and preference information of the user. The information data related to video contents, stored in the storage 18 may be recorded into the non-volatile RAM 19.

In the above-described digital video recorder, the speaker 10 and the display 12 are formed as a unit. The digital video recorder may be configured such that these parts are omitted, and the audio signal and the video signal are output to the outside.

Figure 2:
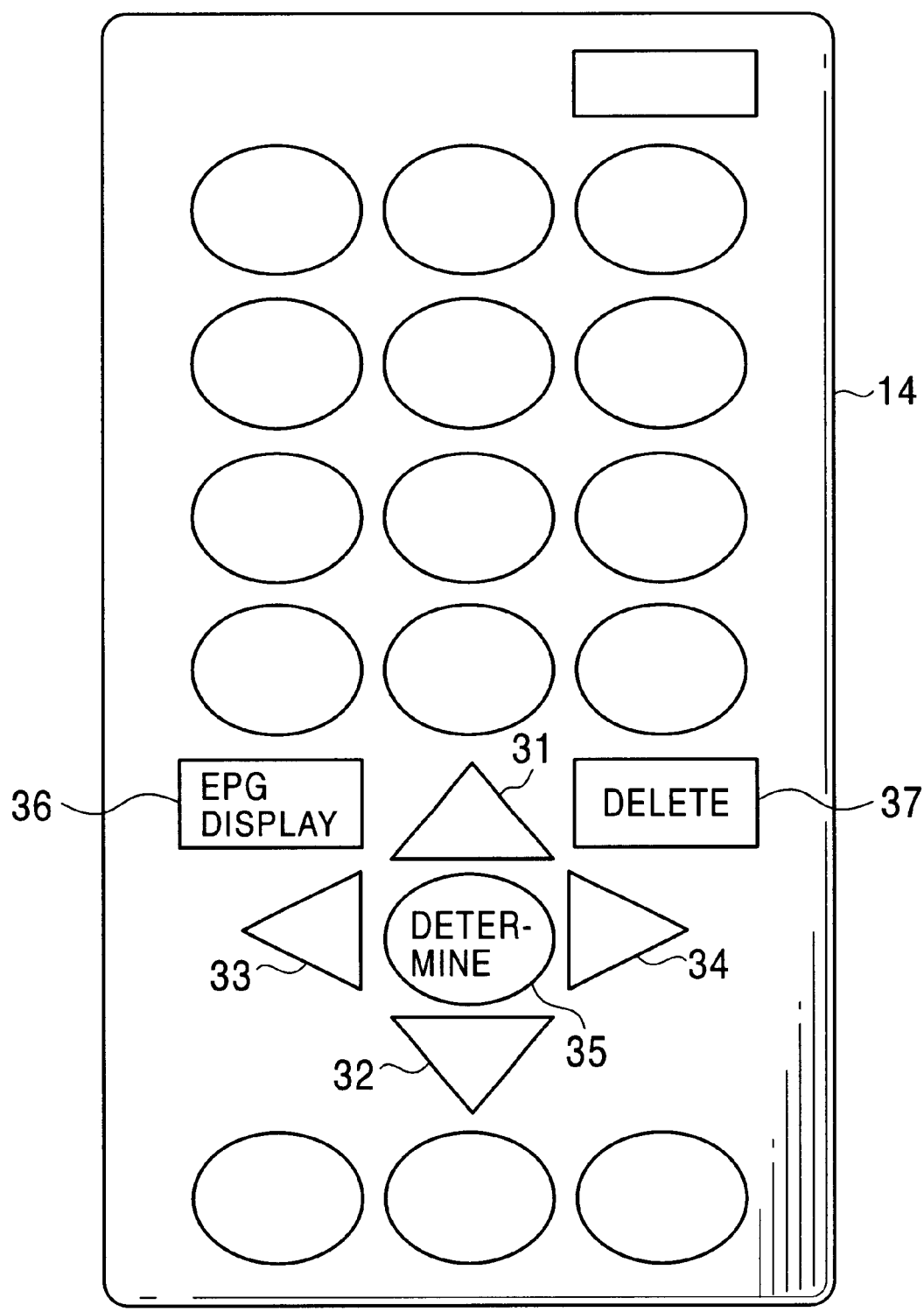
FIG. 2 is a view showing an example exterior structure of a video commander shown in FIG. 1.

FIG. 2 shows an example exterior structure of the remote commander 14.

In the case shown in FIG. 2, when the user presses an up arrow button 31, a selection cursor 65 (FIG. 6) moves to the upper item. When the user presses a down arrow button 32, the selection cursor 65 moves to the lower item. When the user presses a left arrow button 33, the selection cursor 65 moves to the left item. When the user presses a right arrow button 34, the selection cursor 65 moves to the right item.

When the user presses a determine button 35, it is determined that the video content selected by the selection cursor 65 will be reproduced. When the user presses an EPG display button 36, an EPG screen (FIG. 6) is displayed on the display 12. When the user presses a delete button 37, the video content selected by the selection cursor 65 is deleted among video contents displayed on the EPG screen.

Instead of the up arrow button 31, the down arrow button 32, the left arrow button 33, the right arrow button 34, and the determine button 35, a jog dial may be used, which integrates the above buttons.

Figure 3:
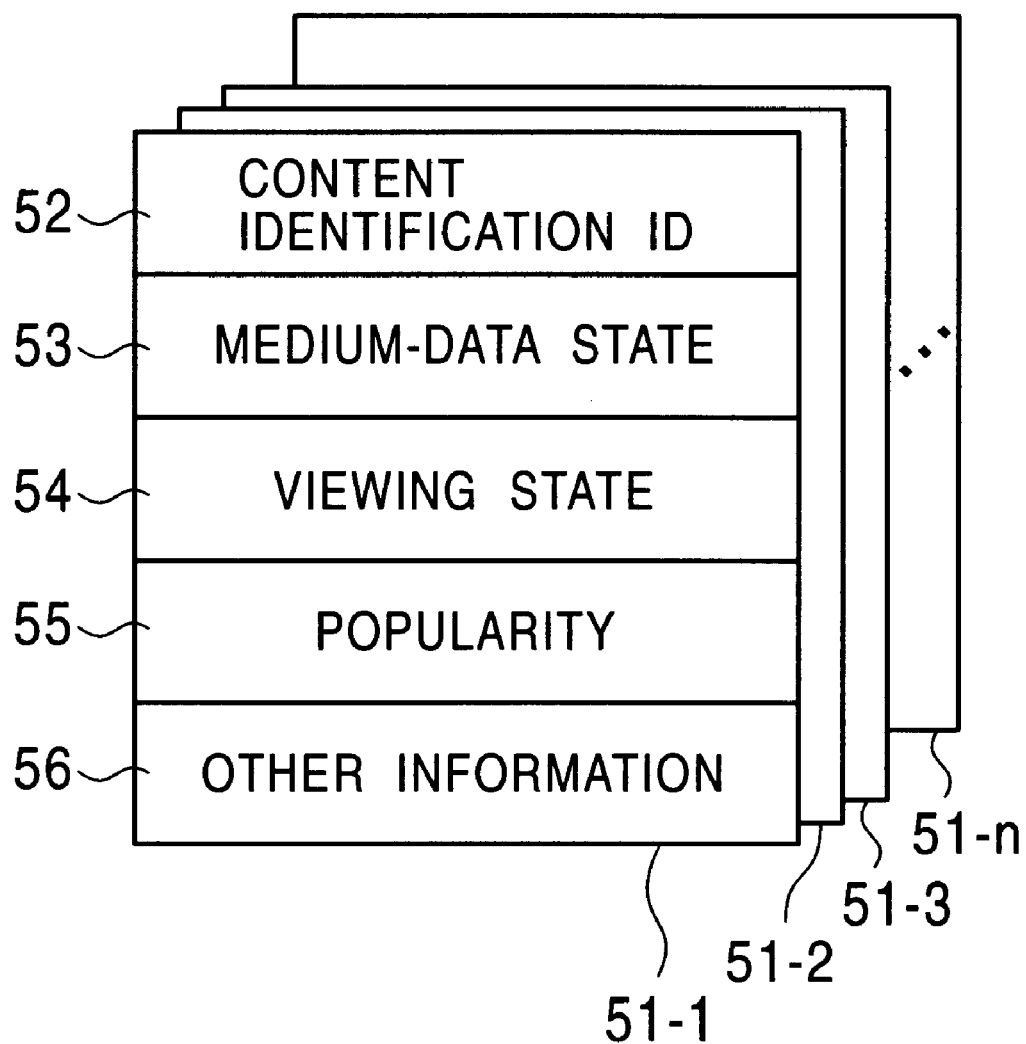
FIG. 3 is a view showing information data related to video contents.

FIG. 3 is a view showing an example structure of information data related to video contents. In this case, each of information data 51-1 to 51-n (hereinafter collectively called information data 51 if it is not necessary to distinguish each of the information data 51-1 to 51-n) is formed of a content identification ID 52, a medium-data state 53, a viewing state 54, a popularity 55, and other information 56.

The content identification ID 52 records a code which uniquely identifies one video content. The digital video recorder can access the data of a video content by using the content identification ID 52. When a file system is used in the storage 18, for example, the content identification ID 52 corresponds to a video file name. In video on demand (VOD), the content identification ID 52 corresponds to a program ID assigned to each program in a server (not shown).

The medium-data state 53 records whether the content has been recorded, whether medium data has been deleted, or whether deleted medium data can be recovered or not.

The viewing state 54 records whether the video content has been viewed or not, or how far the content has been viewed.

The popularity 55 indicates the popularity of the video content according to an audience rating or the number of audiences who actually viewed the content, and records the numerical value of the popularity. As for a video content which has not yet been broadcasted, the number of times image recording has been reserved for the content is recorded.

The other information 56 records information related to the video content, other than the medium-data state 53, the viewing state 54, and the popularity 55. The information includes, for example, the title, the length, and information related to image data (icon) indicating the video content. These types of information can be obtained from EPG data.

The information data 51 may be a part of EPG data. A part of the information data 51 from the content identification ID 52 to the other information 56 may be omitted.

As described above, the digital video recorder can generate the information data 51 for each video content. The information data 51 may be formed of an arrangement or a link list in which pointers are used for linking, or may be stored in a data base. To read the information data 51 of each video content, a number, such as a sequential number of the arrangement of the information data 51 or a record ID of the data base, may be assigned to the information data 51 of each video content. The information data 51-1 to 51-n is stored in the storage 18 or the non-volatile RAM 19.

When a video content is newly recorded into the digital video recorder, information data 51 is generated. When the user has viewed a video content, the viewing state 54 is updated, and it is reported to the server of the broadcasting station through the modem 4 that the content has been viewed. The broadcasting station generates (calculates) popularity data according to the viewing states of the video content reported from a plurality of digital video recorders. With this operation, the popularity 55 of the information data 51 is updated according to the latest popularity data always or periodically sent from the broadcasting station.

When the user presses the delete button 37 (manual deletion), or when automatic deletion is performed, the digital video recorder updates the corresponding medium-data state 53. The digital video recorder may be configured such that, when a content is deleted, if the medium data is not destroyed and can be recovered, the digital video recorder records the state into the medium-data state 53, and if the medium data is deleted and it cannot be recovered, the digital video recorder deletes the information data 51 of the video content.

In addition, for example, the information data 51 of a video content may be generated or deleted in line with EPG data such that when EPG data is received, the information data 51 is generated, and when EPG data for old contents is deleted, the information data 51 of the video contents is deleted.

EPG display processing will be described next by referring to flowcharts shown in FIG. 4 and FIG. 5. The processing is started when the user operates the remote commander 14 to check an EPG screen.

In step S11, the CPU 15 determines whether the user has pressed the EPG display button 36 (FIG. 2). Until the EPG display button 36 is pressed, the CPU awaits. When it is determined in step S11 that the EPG display button 36 has been pressed, the CPU 15 displays an EPG screen on the display 12. With this operation, the EPG screen, such as that shown in FIG. 6, is displayed on the display 12. In the case shown in FIG. 6, the EPG screen includes a program-table area 61, a video-display area 62, a detailed-information area 63, and a selected-video-display area 64.

In step S12, the CPU 15 reads EPG data and the information data 51 of video contents stored in the storage 18 or the non-volatile RAM 19. In step S13, the CPU 15 displays the video content being currently reproduced, in the video-display area 62 according to the information data 51 of video contents read in the process of step S12. With this operation, as in the case shown in FIG. 6, the video content being currently reproduced (program A in the case shown in FIG. 6) is displayed in the video-display area 62.

In step S14, the CPU 15 displays the programs of each channel and information related to the programs in the program-table area 61 according to the information data 51 of video contents read in the process of step S12. With this operation, as in the case shown in FIG. 6, the program name, length (reproduction time), audience rating, popularity, or the state (being reproduced or has been reproduced) of each program is displayed for each channel in the program-table area 61.

In the case shown in FIG. 6, the list of video contents is displayed with icons for six channels (channel-1 to channel-6) in the program-table area 61. When the number of video contents exceeds that of video contents which can be displayed on the screen, video contents assigned to a time zone currently displayed are displayed with icons and a time scale (in the case shown in FIG. 6, Jul. 7, 2000 and 7:00 PM to 10:00 PM) is shown in the program-table area 61. The icon of the video content (in the case shown in FIG. 6, program A) currently displayed has a "being reproduced" mark. The icon of a video content (in the case shown in FIG. 6, program E) which has been viewed has a "already viewed" mark. The icon of a video content (in the case shown in FIG. 6, program F) of which the medium data was deleted is displayed in gray or light to indicate that the content is in a "reproduction impossible" state.

Figure 4:
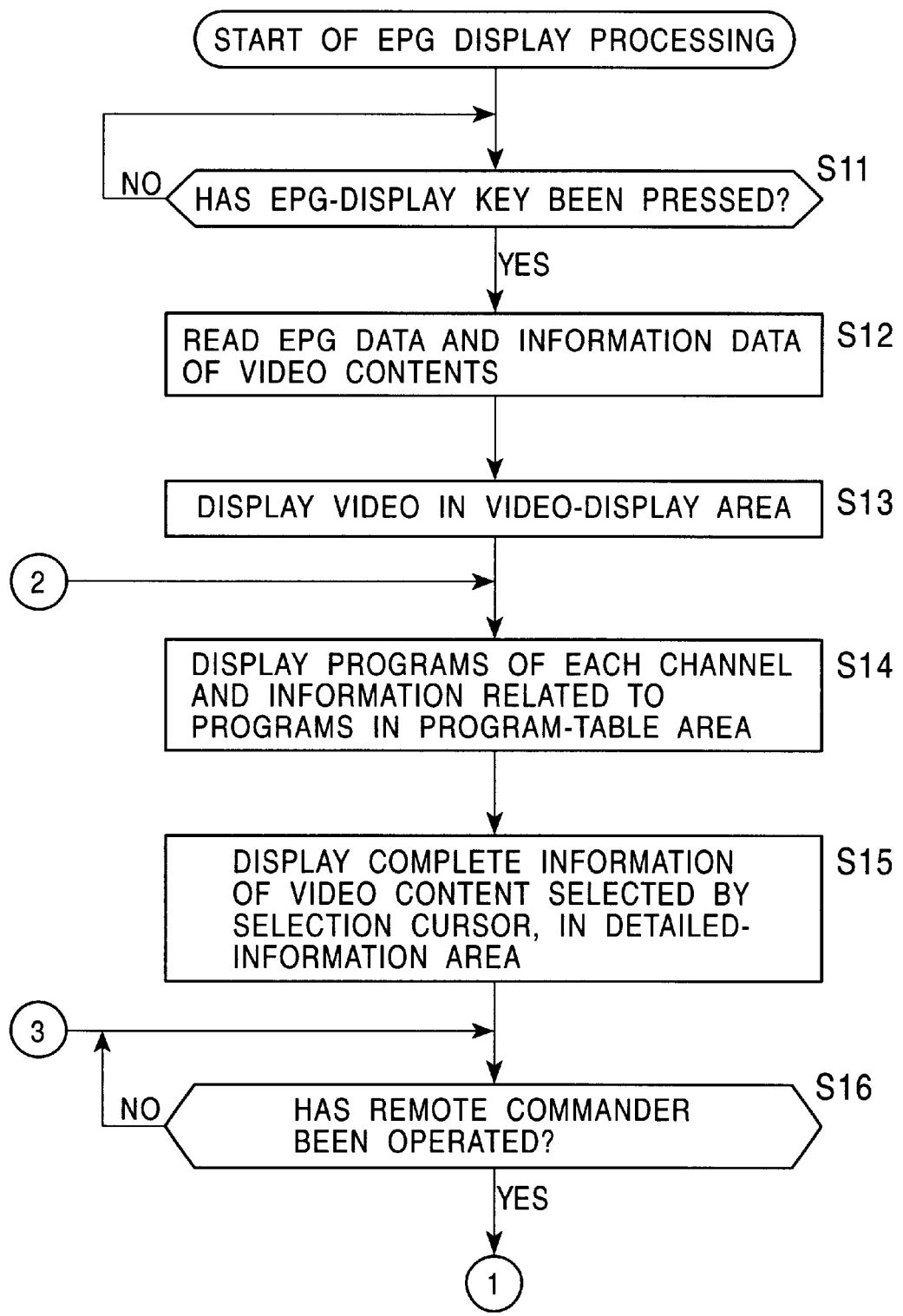
FIG. 4 is a flowchart of EPG display processing.
Figure 5:
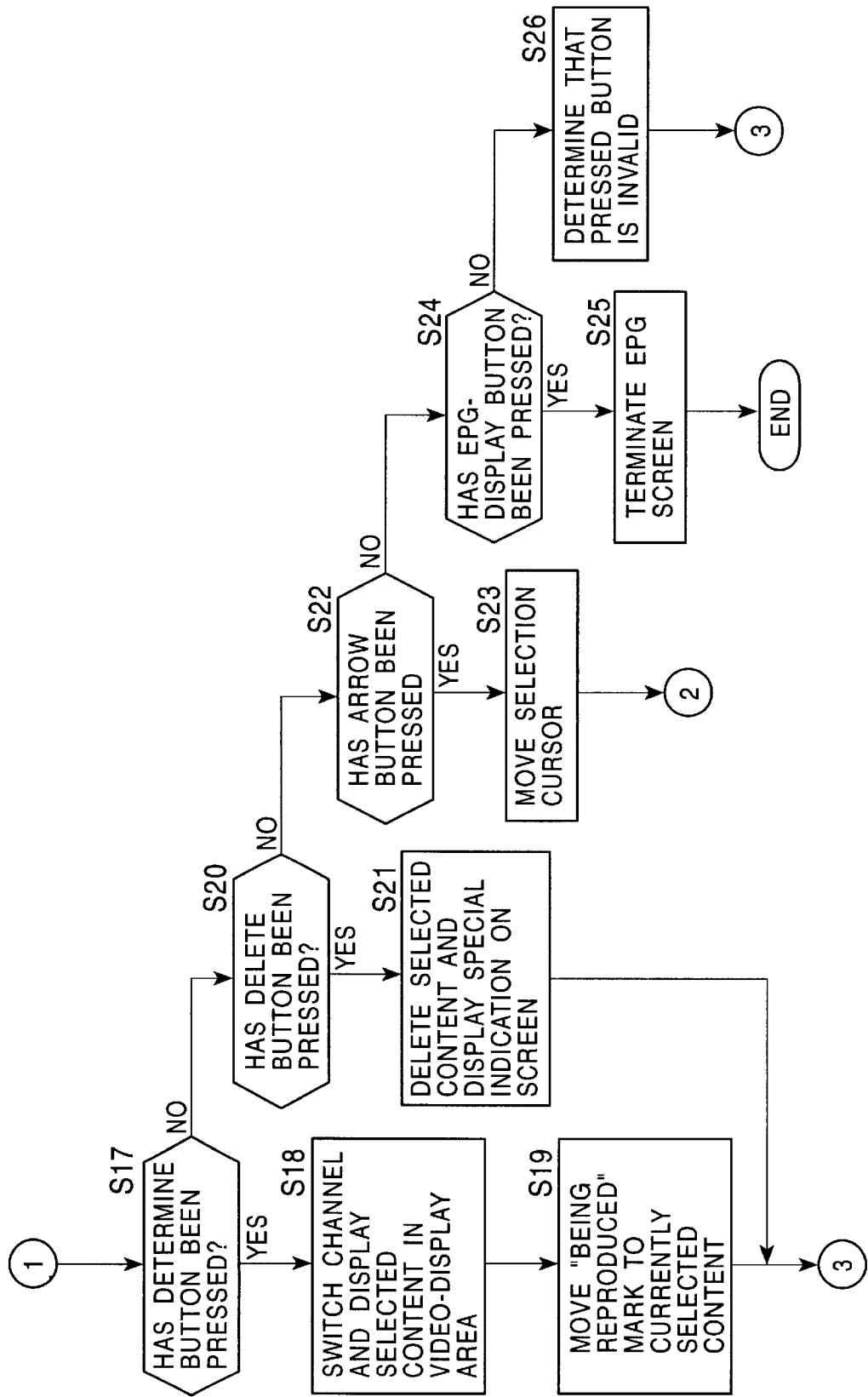
FIG. 5 is a flowchart following that shown in FIG. 4.

Back to FIG. 4, in step S15, the CPU 15 displays the complete information of the video content selected by the selection cursor 65 in the detailed-information area 63. With this operation, as in the case shown in FIG. 6, detailed information recorded into the information data 51 of the video content (in the case shown in FIG. 6, program D) selected by the selection cursor 65 is displayed in the detailed-information area 63, and the icon image of the video content is displayed in the selected-video display area 64.

In step S16, the CPU 15 determines whether the user has operated the remote commander 14. Until the remote commander 14 is operated, the CPU 15 awaits while the EPG screen is displayed on the display 12.

When it is determined in step S16 that the user has operated the remote commander 14, the processing proceeds to step S17, and the CPU 15 determines whether the button operated (pressed) by the user in the process of step S16 is the determine button 35.

When it is determined in step S17 that the button pressed by the user is the determine button 35, the processing proceeds to step S18, and the CPU 15 switches the channel to the channel (in the case shown in FIG. 6, channel-3) to which the video content (in the case shown in FIG. 6, program D) currently selected by the selection cursor 65 belong, and reproduces (displays) the video content in the video-display area 62. In step S19, the CPU 15 moves the "being reproduced" mark to the icon of the video content selected by the selection cursor 65 and being reproduced in the video-display area 62, the processing returns to step S16, and the above-described processes are repeated.

When it is determined in step S17 that the button pressed by the user is not the determine button 35, the processing proceeds to step S20, and the CPU 15 determines whether the button pressed by the user is the delete button 37.

When it is determined in step S20 that the button pressed by the user is the delete button 37, the CPU 15 deletes the medium data corresponding to the video content (in the case shown in FIG. 6, program D) selected by the selection cursor 65 and displayed in the program-table area 61 on the EPG screen, and displays a special indication on the EPG screen. Specifically, to indicate a "reproduction impossible" state, the icon of the deleted video content is displayed light or in gray. Then, the processing returns to step S16 and the above-described processes are repeated.

When it is determined in step S20 that the button pressed by the user is not the delete button 37, the processing proceeds to step S22, and the CPU 15 further determines whether the button pressed by the user is an arrow button (up arrow button 31, down arrow button 32, left arrow button 33, or right arrow button 34).

When it is determined in step S22 that the button pressed by the user is an arrow button, the processing proceeds to step S23, and the CPU 15 moves the selection cursor 65 to the upper item, the lower item, the left item, or the right item, the processing returns to step S14, and the above-described processes are repeated.

When it is determined in step S22 that the button pressed by the user is not an arrow button, the processing proceeds to step S24, and the CPU 15 further determines whether the button pressed by the user is the EPG-display button 36.

When it is determined in step S24 that the button pressed by the user is the EPG-display button 36, the processing proceeds to step S25, and the CPU 15 terminates the EPG screen being displayed on the display 12, and displays the video currently reproduced, in the entire screen of the display 12.

When it is determined in step S24 that the button pressed by the user is not the EPG-display button 36, the processing proceeds to step S26, and the CPU 15 determines that the button pressed by the user is invalid, the processing returns to step S16, and the above-described processes are repeated.

As described above, in the EPG screen shown in FIG. 6, EPG data for the past is displayed assuming that all programs or a part thereof has been recorded for some channels within a predetermined past period. The user can operate an arrow button (left arrow button 33 or right arrow button 34) of the remote commander 14 to scroll the time zones on the EPG screen so as to see the future programs.

The "being reproduced" mark, the "already viewed" mark, and further information, such as an audience rating and a popularity, are indicated by characters. Indications are not limited to these indicators. A different color or an icon mark may be used.

The time scale can be used to indicate how new programs are. A method to indicate it is not limited to the time scale. Different-color backgrounds may be used to indicate the past, the present, and the future. For example, the past time zones are indicated in green, the future time zones are indicated in red, and the color gradually changes from green to red as the time changes from the past to the future.

It is also possible that video contents stored in the storage 18 or the non-volatile RAM 19 are assigned to several virtual channels by categories or others, and a program table for the virtual channels are displayed. In this case, in addition to the indications of information related to video contents, shown in FIG. 6, how new the video contents are can be indicated by special colors or marks to allow the user to easily understand how new the video contents are.

In another case in which the modem 4 is used in a video-on-demand environment, the digital video recorder can display an EPG screen if it does not have the storage 18.

In a still another case, turning on or off (displaying or non-displaying) of the EPG screen and operations such as reproducing or deleting a video content may be performed by different buttons on the remote commander 14 or on a menu screen. When a jog dial is used, or in other cases, if the determine button 35 is pressed, the EPG screen may be automatically closed.

In a yet another case, when a digital video recorder used for analog broadcasting can receive EPG data and information related to programs and store them in a storage 18 or a non-volatile RAM 19, an EPG screen is easily displayed.

Since information related to video contents can be displayed as described above, the following advantages are obtained.

(1) Since the list of a content group assigned to each channel is displayed on a screen and the content currently reproduced is displayed in a special color or displayed with a mark, the user can easily operate the remote commander 14 to select a desired video content for its reproduction, image-recording reservation, or viewing reservation. In addition, since the video content being reproduced and the selected video content are separately displayed, the user can easily understand the time relationship and channel relationship between the selected content and the content being reproduced.

(2) Since the program currently reproduced and programs which have been viewed are displayed with their descriptions on the EPG screen in TV receivers and STBs (set-top boxes, such as CS tuners and CATV tuners) which support an electronic program guide (EPG data), and information related to programs, such as program popularities, are further displayed, when the user selects a program on the EPG screen, the user can easily understand the condition of the selected program. Therefore, programs which have already been viewed or programs which have already been recorded are prevented from being viewed again or from being recorded again.

(3) When a digital video recorder which can record programs for several hundreds of hours or for several thousands of hours is developed and programs of all channels can be recorded for one week, the user can view desired programs at any time zones without paying attention to when they are broadcasted. To manage the huge number of programs, however, it is important to re-arrange recorded programs by categories or others to form virtual channels, and past EPG data or a virtual-channel program list needs to be displayed. Also in such a case, according to the present invention, the EPG screen can be easily displayed. In addition, information related to video contents are displayed, such as video contents of which medium data has been deleted, video contents which have already been viewed, the video content being reproduced, the popularity of video contents, and how new the video contents are. Therefore, the user can easily understand the conditions of programs within a short period.

(4) When a video content is selected by the selection cursor 65 and the determine button 35 is pressed, since the video content is reproduced in the video-display area 62 on the EPG screen, the user can check the video content without closing the EPG screen to easily and correctly select a desired program.

(5) When past EPG data or EPG data for virtual channels is displayed, all related information cannot be displayed in the display area of each content on the EPG screen in some cases. Since the detailed-information area 63 is provided, the user can check in this area complete information related to the video content selected by the selection cursor 65.

(6) When EPG data or an EPG screen for virtual channels is displayed, if buttons other than channel buttons on the remote commander 14 are operated to select a program and reproduce it, the channel is switched to the channel to which the selected video content belongs, improving convenience in operations. With a fast-forward operation, catching-up reproduction is possible for the program currently broadcasted.

(7) When a content list is displayed with a DVD player having a disk-changer function, information related to video contents is shown, such as video contents which have already been viewed and the video content being reproduced. Therefore, the user can understand the conditions of the video contents within a short period to easily select a desired video content.

(8) When the user selects a video content to be viewed from a huge video library in video on demand, a content list screen plays an important role. If information related to video contents, such as the video content being reproduced, already-viewed video contents, and the popularity of the video contents based on the number of times they have been viewed so far, is displayed on the content-list screen, the user can understand the conditions of the video contents within a short period to easily select a desired video content.

The above-described series of processing can be executed not only by hardware but also by software. When the series of processing is executed by software, a program constituting the software is installed from a recording medium to a computer built in special hardware, or to an apparatus which can execute various functions by installing various programs, such as a general-purpose personal computer.

The recording medium can be a package medium which is distributed separately from a computer to provide the user with the program and in which the program is recorded, such as a magnetic disk (including a floppy disk), an optical disk (including compact disk read only memory (CD-ROM) and a digital versatile disk (DVD)), a magneto-optical disk (including a Mini disk (MD)), or a semiconductor memory. In addition, the recording medium can be a device in which the program is recorded and which is provided for the user in a condition in which it is built in a computer in advance, such as the ROM 17, the storage 18, or the non-volatile RAM 19.

In the present specification, steps describing the program recorded in a recording medium include not only processing to be executed in a time-sequential manner in a described order but processing which is not necessarily executed time-sequentially but is executed in parallel or independently.

What is claimed is:

1. An information-display control apparatus comprising:
    recording means for recording a plurality of contents;
    specifying means for specifying content information related to the plurality of contents;
    first display control means for controlling the display in a program table area of a list of the plurality of contents according to the content information specified by the specifying means;
    second display control means for controlling, when a predetermined content is selected among the plurality of contents displayed in the list by the first display control means, such that the content information corresponding to the predetermined content is displayed in a detailed information area; and
    third display control means for controlling, when an instruction is issue to reproduce the predetermined content among the plurality of contents displayed in the list by the first display control means, such that the predetermined content stored in the recording means is read and displayed in a video display area;
    whereby said apparatus is operable to simultaneously display said program table area, said detailed information area, said video display area and a selected video display area; and
    whereby for each item in said list displayed in said program table area, if said item has been deleted said list includes an indication that said item has been deleted.

2. An information-display control apparatus according to claim 1, wherein the first display control means controls the display such that the plurality of contents are differentiated by their newness according to the date and time when each content is recorded.

3. An information-display control apparatus according to claim 1, wherein the third display control means controls the display such that the content being reproduced is differentiated from the other contents.

4. An information-display control apparatus according to claim 1, wherein the content information includes a content identification ID, a medium-data state, viewing state, and a popularity.

5. An information-display control method comprising:
 a recording control step of controlling recording of a plurality of contents;
 a specifying step of specifying content information related to the plurality of contents;
 a first display control step of controlling the display in a program table area of a list of the plurality of contents according to the content information specified in the specifying step;
 a second display control step of controlling, when a predetermined content is selected among the plurality of contents displayed in the list in the process of the first display control step, such that the content information corresponding to the predetermined content is displayed in a detailed information area; and
 a third display control step of controlling, when an instruction is issued to reproduce the predetermined content among the plurality of contents displayed in the list in the process of the first display control step, such that the predetermined content for which recording is controlled in the process of the recording control step is read and displayed in a video display area;
 whereby said method includes simultaneously displaying said program table area, said detailed information area, said video display area and a selected video display area; and
 whereby for each item in said list displayed in said program table area, if said item has been deleted said list includes an indication that said item has been deleted.

* * * * *